(12) United States Patent
Wung (10) Patent No.: US 8,379,636 B2
(45) Date of Patent: Feb. 19, 2013

(54) METHODS AND APPARATUSES FOR ESTABLISHING M3UA LINKSETS AND ROUTES

(75) Inventor: Joseph Wung, Tewksbury, MA (US)

(73) Assignee: Sonus Networks, Inc., Westford, MA (US)

( * ) Notice: Subject to any disclaimer, the term of this patent is extended or adjusted under 35 U.S.C. 154(b) by 501 days.

(21) Appl. No.: 12/568,298

(22) Filed: Sep. 28, 2009

(65) Prior Publication Data

US 2011/0075564 A1  Mar. 31, 2011

(51) Int. Cl.
*H04L 12/66* (2006.01)

(52) U.S. Cl. ......................................... 370/355; 370/401

(58) Field of Classification Search ................... 370/352, 370/353, 355, 357, 389, 392, 395.1, 398, 370/395.3, 395.31, 400, 401, 410
See application file for complete search history.

(56) References Cited

U.S. PATENT DOCUMENTS

| | | | | |
|---|---|---|---|---|
| 5,706,286 A | | 1/1998 | Reiman et al. | 370/401 |
| 6,442,169 B1 * | | 8/2002 | Lewis | 370/401 |
| 6,965,567 B2 | | 11/2005 | Ramos et al. | 370/235 |
| 6,996,225 B1 * | | 2/2006 | Bordonaro et al. | 379/229 |
| 7,006,433 B1 * | | 2/2006 | Dantu et al. | 370/218 |
| 7,313,129 B1 * | | 12/2007 | Bova et al. | 370/352 |
| 7,515,607 B2 * | | 4/2009 | Angermayr et al. | 370/466 |
| 7,653,051 B2 * | | 1/2010 | Schantz et al. | 370/356 |
| 7,701,929 B2 * | | 4/2010 | Bettis et al. | 370/354 |
| 2004/0068534 A1 * | | 4/2004 | Angermayr et al. | 709/200 |
| 2005/0027688 A1 * | | 2/2005 | Brady et al. | 707/3 |
| 2006/0064475 A1 | | 3/2006 | Angermayr et al. | 709/220 |
| 2006/0203987 A1 * | | 9/2006 | Angermayr et al. | 379/230 |
| 2007/0121908 A1 * | | 5/2007 | Benedyk et al. | 379/350 |
| 2007/0248103 A1 * | | 10/2007 | Delaney et al. | 370/395.52 |
| 2008/0096547 A1 | | 4/2008 | Zhang et al. | 455/424 |
| 2009/0135723 A1 | | 5/2009 | Davidson et al. | 370/241 |

OTHER PUBLICATIONS

International Search Report and Written Opinion from PCT/US2010/049827, 6 pages, Nov. 17, 2010.

* cited by examiner

*Primary Examiner* — Michael Thier
*Assistant Examiner* — Curtis A Alia (57) ABSTRACT

Methods and apparatuses, including computer program products, are described for establishing M3UA linksets and routes. The method includes generating, at a signaling gateway, a linkset that includes a plurality of M3UA links between two or more IP hosts on the signaling gateway and a single IP host on a signal transfer point. The method also includes configuring, at the signaling gateway, a route based on the linkset to direct messages from the signaling gateway to a single destination node.

21 Claims, 3 Drawing Sheets

METHODS AND APPARATUSES FOR ESTABLISHING M3UA LINKSETS AND ROUTES

FIELD OF THE INVENTION

The subject matter of this application relates generally to methods and apparatuses, including computer program products, for establishing M3UA linksets and routes.

BACKGROUND OF THE INVENTION

Many traditional Public Switched Telephone Networks (PSTN) utilize the Signaling System 7 (SS7) messaging protocol stack to establish and terminate telephone calls, as well as provide enhanced telephone functionality such as number translation and short message services (SMS). The Message Transfer Part (MTP) is a component of the SS7 protocol stack, and covers several functions including network communication, data transmission, and message routing to higher levels of the SS7 protocol stack.

The MTP is divided into three levels, each corresponding to a different type of functionality. MTP Level 1 is the Signaling Data Link Functional Level (Data Link Level), MTP Level 2 is the Signaling Link Functional Level (Link Level), and MTP Level 3 is the Signaling Network Functional Level (Network Level). Other components of the SS7 protocol stack are considered MTP Users. MTP Users include the Signaling Connection Control Part (SCCP), the Integrated Services Digital Network (ISDN), the ISDN User Part (ISUP), or the Telephone User Part (TUP).

MTP Level 3 (also called MTP3) provides routing functionality to transport signaling messages through the SS7 network to the requested endpoint. MTP3 is also responsible for network management; when the availability of MTP Level 2 data links changes, MTP3 establishes alternative links as required and propagates information about route availability through the network. Each network element in the SS7 network has a unique identifier called a point code. Message routing is performed based on the point code, and each end of an MTP3 link must bear a unique point code.

MTP3 is limited to use in the SS7 network. The recent and dramatic proliferation of Internet Protocol (IP) networks across all forms of communication has led service providers to take advantage of the availability, flexibility and scalability of the IP networks to offer IP-based telephony services. Therefore, integration of the protocols used by the pre-existing SS7 telephony networks and the newer IP networks to allow communication between the two types of networks is a crucial element to providing robust and easily accessible telephony services.

In response to the challenge of integrating these types of networks, a set of protocols called SIGTRAN was developed based on the traditional SS7 protocols but extending the SS7 functionality to IP-based transport and communication mechanisms. One of the SIGTRAN protocols, MTP Level 3 User Adaptation (M3UA), enables the MTP3 User Parts (e.g., ISUP, SCCP and TUP) of the SS7 protocols to run over IP-based networks instead of traditional telephony networks (e.g., PSTN).

Links in the MTP3 protocol are traditionally defined by the two distinct point codes at each end of the link. The nature of the M3UA protocol, however, requires the two ends to bear the same point code. Thus, the traditional definition of links using point codes under the MTP3 protocol is not applicable to M3UA. In addition, the definition of the M3UA protocol is focused on having a single M3UA interface between the MTP3 and its user(s).

High availability, load balancing, and scalability are essential requirements of modern communication networks. Conventional systems are unable to meet these requirements. A need therefore exists for improved methods and apparatuses for establishing M3UA linksets and routes.

SUMMARY

The invention, in one aspect, features a method for establishing M3UA linksets and routes. The method includes generating, at a signaling gateway, a linkset that includes a plurality of M3UA links between two or more IP hosts on the signaling gateway and a single IP host on a signal transfer point. The method also includes configuring, at the signaling gateway, a route based on the linkset to direct messages from the signaling gateway to a single destination node.

The invention, in another aspect, features a method for establishing M3UA linksets and routes. The method includes means for generating, at a signaling gateway, a linkset that includes a plurality of M3UA links between two or more IP hosts on the signaling gateway and a single IP host on a signal transfer point. The method also includes means for configuring, at the signaling gateway, a route based on the linkset to direct messages from the signaling gateway to a single destination node.

The invention, in another aspect, features a system for establishing M3UA linksets and routes. The system includes a linkset generation module on a signaling gateway. The linkset generation module is configured to generate a linkset that includes a plurality of M3UA links between two or more IP hosts on the signaling gateway and a single IP host on a signal transfer point. The linkset generation module is also configured to configure a route based on the linkset to direct messages from the signaling gateway to a single destination node.

The invention, in another aspect, features a computer program product for establishing M3UA linksets and routes. The computer program product is tangibly embodied in a computer-readable storage medium. The computer program product contains instructions operable to cause a data processing apparatus to generate, at a signaling gateway, a linkset that includes a plurality of M3UA links between two or more IP hosts on the signaling gateway and a single IP host on a signal transfer point. The computer program product also contains instructions operable to cause the data processing apparatus to configure, at the signaling gateway, a route based on the linkset to direct messages from the signaling gateway to a single destination node.

The invention, in another aspect, features a method for establishing M3UA linksets and routes. The method includes generating, at the signaling gateway, a plurality of linksets, wherein each linkset of the plurality of linksets comprises a plurality of M3UA links between (i) two or more IP hosts on the signaling gateway and (ii) a unique IP host on a signal transfer point, and configuring, at the signaling gateway, a plurality of routes to direct messages from the signaling gateway to a single destination node, wherein each route of the plurality of routes is based on a different linkset of the plurality of linksets.

In some embodiments, any of the above aspects of the invention can include one or more of the following features. In some embodiments, the method includes configuring, at the signaling gateway, a plurality of routes based on the linkset to direct messages to a plurality of destination nodes, wherein each route of the plurality of routes directs messages from the signaling gateway to a different destination node of the plurality of destination nodes. In some embodiments, the method includes selecting one route from the plurality of routes, and directing messages from the signaling gateway to the single destination node using a directly-connected M3UA link of the linkset on which the route is based, wherein the directly-connected M3UA link connects a first IP host of the two or more IP hosts on the signaling gateway with the single IP host on the signal transfer point.

In some embodiments, the method includes generating, at the signaling gateway, a plurality of linksets, wherein each linkset of the plurality of linksets comprises a plurality of M3UA links between (i) the two or more IP hosts on the signaling gateway and (ii) a unique IP host on a signal transfer point, and configuring, at the signaling gateway, a plurality of routes to direct messages from the signaling gateway to the single destination node, wherein each route of the plurality of routes is based on a different linkset of the plurality of linksets. The route can be associated with a point code of the single destination node.

In some embodiments, the method includes directing M3UA messages from the signaling gateway to the single destination node using a directly-connected M3UA link of the plurality of M3UA links, wherein the directly-connected M3UA link connects a first IP host of the two or more IP hosts on the signaling gateway with the single IP host on the signal transfer point. In some embodiments, the method includes directing the messages to the single destination node using an indirectly-connected M3UA link of the plurality of M3UA links in response to the directly-connected M3UA link being unavailable, wherein the indirectly-connected M3UA link connects a second IP host of the two or more IP hosts on the signaling gateway with the single IP host on the signal transfer point.

In some embodiments, the method includes determining the directly-connected M3UA link is unavailable based on a network traffic congestion level of the directly-connected M3UA link. The network traffic congestion level is determined based on a threshold level of a SCTP transmit buffer. In some embodiments, the method includes determining the directly-connected M3UA link is unavailable in response to detecting a failure of the directly-connected M3UA link. Each of the plurality of M3UA links can be defined by an IP address and a SCTP port of one of the two or more IP hosts on the signaling gateway, and an IP address and a SCTP port of the single IP host on the signal transfer point. The two or more IP hosts on the signaling gateway can include processors in communication with each other.

In some embodiments, a user interface is provided on the signaling gateway to allow a user to generate the linkset and configure the route. Generating the linkset can include assigning a user-defined name to the linkset. The user-defined name can be stored in a data storage module on the signaling gateway. The signal transfer point and the signaling gateway can be different pieces of hardware. The single destination node can be a switch located on a SS7 network. The messages can include data packets associated with telephone calls.

In some embodiments, a route can be selected. A directly-connected M3UA link of the linkset, upon which the selected route is based, can be selected using a load balancing technique, and messages can be directed to the single destination node using the directly-connected M3UA link.

Any of the embodiments described herein can contain one or more of the following advantages. In some embodiments, the signaling gateway evenly distributes messages to the IP hosts on the signal transfer points using available M3UA links and routes whenever possible. In some embodiments, the signaling gateway also configures a plurality of routes, each based on a different linkset, to direct messages to the same destination node. As a result, there is a reduced chance of high network traffic congestion levels at the IP hosts on the signal transfer points. In addition, a greater level of network scalability and availability can be achieved by generating multiple linksets and routes to direct messages over a communications network.

In some embodiments, the linksets and routes do not require the signal transfer points, to which the linksets are connected, to configure the same linkset to include the same links. Therefore, unlike the traditional SS7 protocol, only the signaling gateway needs to define the M3UA linksets and routes.

DETAILED DESCRIPTION

In general overview, the techniques described below include methods and apparatuses for establishing M3UA linksets and routes. The techniques, including both methods and apparatuses, involve generation of linksets comprising a plurality of M3UA links between two or more IP hosts on a signaling gateway and an IP host on a signal transfer point. The techniques also involve the configuration of routes based on the linksets in order to direct messages over a communications network to a single destination node. Some embodiments of the techniques are related to determining the availability of a particular M3UA link in a linkset or the availability of a route upon which the linkset is based. Some embodiments direct messages over a different M3UA link in the linkset if an originally-selected M3UA link is unavailable due to high network traffic congestion levels or upon detection of a failure of one or more M3UA links.

Figure 1:
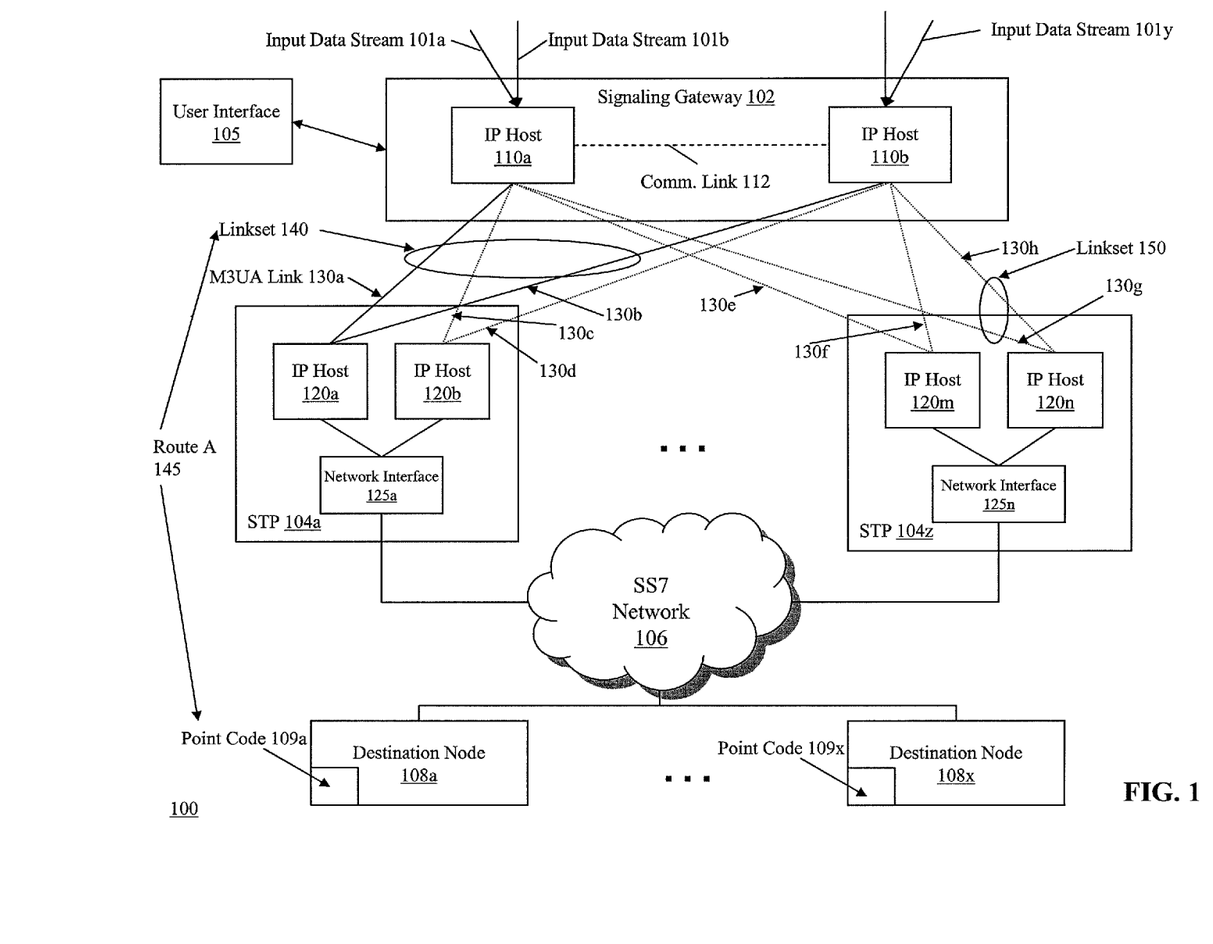
FIG. 1 is a block diagram of a system for establishing M3UA linksets and routes, according to an illustrative embodiment of the invention.

FIG. 1 is a block diagram of an exemplary system 100 for establishing M3UA linksets and routes. The system 100 includes a signaling gateway 102, one or more signal transfer points 104a-z, an SS7 network 106, and one or more destination nodes 108a-x. The signaling gateway 102 includes a plurality of IP hosts (e.g., IP hosts 110a-b). The IP hosts 110a-b are connected via a communications link 112. The one or more signal transfer points 104a-z include a plurality of IP hosts (e.g., IP hosts 120a-n). The IP hosts 110a-b on the signaling gateway 102 are connected with the plurality of IP hosts 120a-n on the one or more signal transfer points 104a-z via a plurality of M3UA links 130a-h.

Each IP host (e.g., IP hosts 110a-b) in the signaling gateway 102 receives one or more input data streams (e.g., input data streams 101a-y). The input data streams 101a-y include messages corresponding to telephone calls placed by users of telephony devices. For example, the messages received by the IP hosts 110a-b can consist of data corresponding to the M3UA protocol, or any of the MTP3 User Parts (e.g., ISUP, SCCP and TUP). The input data streams 101a-y are received from other nodes (e.g., a media gateway server) connected to the signaling gateway 102. The messages generally include a series of packets, which are units of data formatted for transmission over a communications network. A packet generally contains metadata and a payload. The packet metadata includes attributes related to the packet (e.g., arrival information, destination information, origin information, encoding protocols, or structure of information in the packet). The payload contains the user data (e.g., telephone call data) to be transmitted.

In some embodiments, the IP hosts 110a-b on the signaling gateway 102 include processors which communicate with each other. The IP hosts 110a-b work together to coordinate the receipt of the input data streams 101a-y and transmission of M3UA messages, associated with the input data streams 101a-y, to the signal transfer points 104a-z. For example, upon receiving the input data stream 101a, the IP host 110a determines that it does not currently have any additional message processing capacity. The IP host 110a then directs M3UA messages to the other IP host 110b, and the IP host 110a requests the other IP host 110b to send the M3UA messages on using the same route and corresponding linkset which the IP host 110a would have used if the IP host 110a had available processing capacity. In requesting the IP host 110b to send the M3UA messages using the same route and corresponding linkset, the IP host 110a ensures that traffic is load-balanced among the IP hosts 120a-n on the signal transfer points 104a-z and that no one IP host (e.g., IP host 120a) is receiving a disproportionate amount of traffic. In some embodiments, the processors include central processing units or other integrated circuits of a computing system.

In some embodiments, the processors include distinct software processes executing on a single central processing unit of the signaling gateway 102. The software processes receive the input data streams 101a-y and work together to coordinate the transmission of M3UA messages based on the input data streams 101a-y to IP hosts 120a-n on signal transfer points 104a-z. The signal transfer points 104a then direct SS7 messages based on the M3UA messages to the destination nodes 108a-x via the SS7 network 106.

The IP hosts 110a-b communicate with each other using a communications link 112. In some embodiments the communications link 112 is a hardware link (e.g., a data bus, an electrical circuit). In some embodiments, the communications link 112 is a software link (e.g., a software application).

An M3UA link (e.g., M3UA link 130a) is a Stream Control Transmission Protocol (SCTP) association uniquely defined by parameters associated with the two IP hosts (e.g., IP host 110a and IP host 120a) at the two ends of the M3UA link 130a. For example, in FIG. 1, the M3UA link 130a is uniquely defined by parameters associated with the IP host 110a on the signaling gateway 102 and the IP host 120a on the signaling transfer point 104a. The M3UA link 130a connects the IP host 110a to the IP host 120a. Generally, the parameters used to define the M3UA link 130a are the IP addresses of the IP hosts 110a and 120a residing at each end of the M3UA link 130a and the numbers of the individual SCTP ports through which the M3UA link 130a accesses the IP hosts 110a and 120a, respectively.

The linkset 140 aggregates a plurality of M3UA links (e.g., M3UA links 130a-b) that connect all of the IP hosts (e.g., IP hosts 110a-b) on a signaling gateway (e.g., signaling gateway 102) to a single IP host (e.g., IP host 120a) at a signal transfer point (e.g., STP 104a). The linkset 140 identifies a logical relationship between the M3UA links 130a-b for communication of M3UA messages.

The one or more destination nodes 108a-x correspond to entities on the SS7 network 106 that receive telephony data. Each destination node 108a-x is identified by a unique point code (e.g., point codes 109a-x). In some embodiments, the destination nodes 108a-x include hardware or software switches for transferring telephone calls to, for example, subscribers of a telephony service provider.

Figure 2:
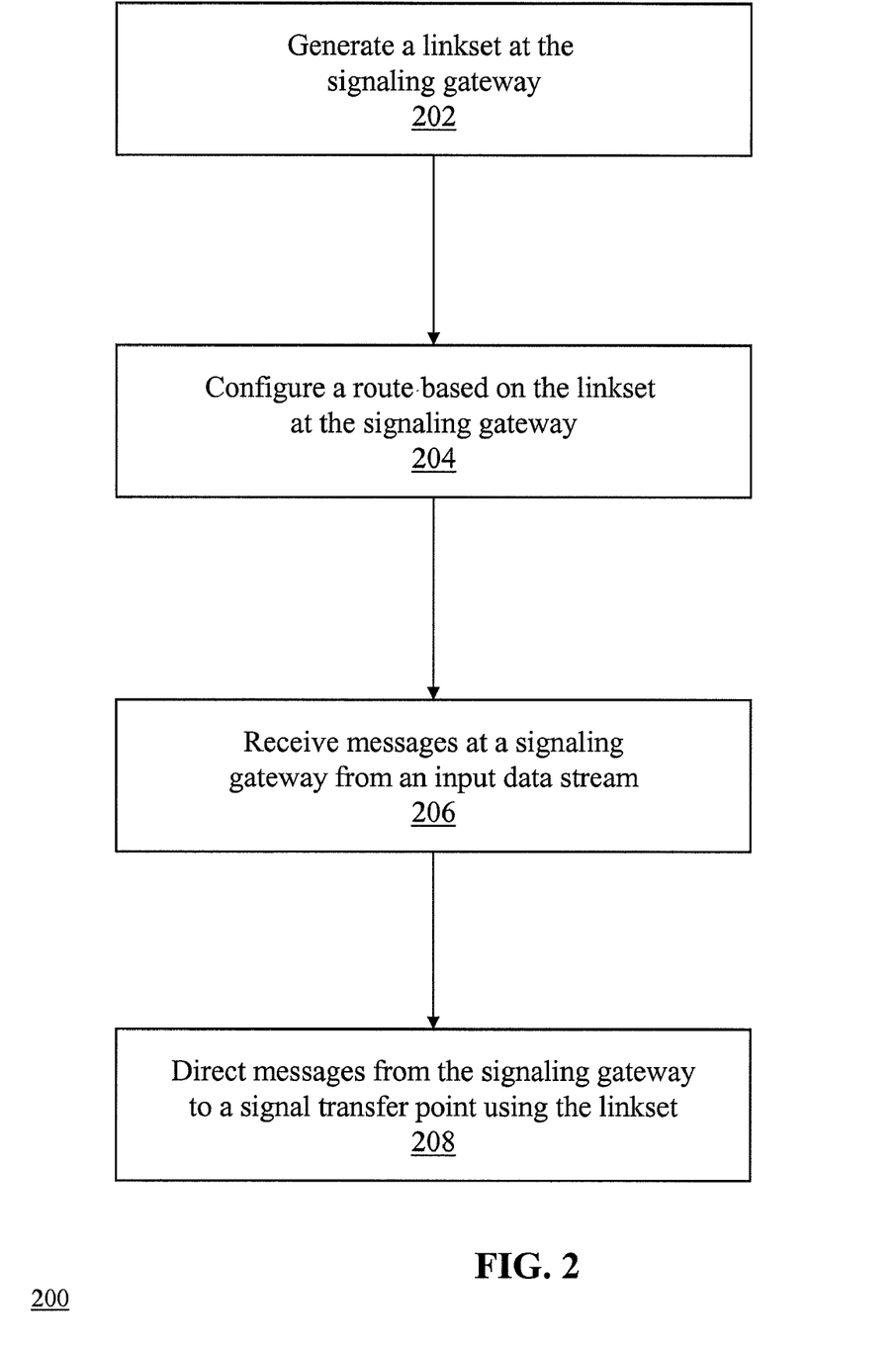
FIG. 2 is a flow diagram of a method for establishing M3UA linksets and routes, according to an illustrative embodiment of the invention.

FIG. 2 is a flow diagram of an exemplary method 200 for establishing M3UA linksets and routes using, for example, the system 100 of FIG. 1. A linkset 140 is generated (202) by aggregating a plurality of M3UA links 130a-b which connect two or more IP hosts 110a-b on a signaling gateway 102 with a single IP host 120a on a signal transfer point 104a. Once the linkset 140 has been generated at the signaling gateway 102, a route is configured (204) based on the linkset 140 and the point code (e.g., point code 109a) of a single destination node (e.g., single destination node 108a). The signaling gateway 102 receives (206) an input data stream (e.g., input data stream 101a) corresponding to a telephone call. Using the route, the signaling gateway 102 directs (208) M3UA messages based on the input data stream 101a to an IP host 120a on a signal transfer point 104a. The signal transfer point 104a then directs SS7 messages based on the M3UA messages to the SS7 network 106 and on to the single destination node 108a.

In some embodiments, the linkset 140 is generated via a user interface 105 provided by the signaling gateway 102. A user accesses the user interface 105 and specifies the set of M3UA links (e.g., M3UA links 130a-b) which connect the two or more IP hosts (e.g., IP hosts 110a-b) on a signaling gateway (e.g., signaling gateway 102) with a single IP host (e.g., IP host 120a) on a signal transfer point (e.g., STP 104a). The user assigns an identifier to the newly-generated linkset (e.g., linkset 140) and stores the identifier in a data storage module (e.g., a database, a memory module) located on the signaling gateway 102. The identifier can be an arbitrary designation used to distinguish the generated linkset 140 from other linksets. The signaling gateway 102 then utilizes the identifier to select a linkset 140 for routing M3UA messages to an IP hosts 120a on a signal transfer point 104a. The signal transfer point 104a then directs SS7 messages based on the M3UA messages to a destination node 108a. The signaling gateway 102 also monitors the M3UA links 130a-b of the linkset 140 for, for example, availability of the IP hosts 120a on the signal transfer point 104a or network traffic congestion levels along an M3UA link 130a.

A route is defined as the combination of a linkset (e.g., linkset 140) connecting the signaling gateway 102 and the signal transfer point 104, and the unique point code (e.g., point code 109a) identifying a single destination node (e.g., destination node 108a). The signaling gateway 102 directs M3UA messages based on a data input stream (e.g., data input stream 101a) through the linkset 140 upon which the route is based to an IP host 120a on a signal transfer point 104a. The signal transfer point 104a then directs SS7 messages based on the M3UA messages to the destination node 108a connected to the SS7 network 106 for which the SS7 messages are intended. In some embodiments, the route is configured via a user interface 105 provided by the signaling gateway 102. A user accesses the user interface 105 and configures a route by selecting a linkset (e.g., linkset 140) connecting the signaling gateway 102 and a signal transfer point (e.g., STP 104a) and associating the linkset with the point code (e.g., point code 109a) of a single destination node (e.g., destination node 108a) residing on the SS7 network 106. The route is stored in a data storage module (e.g., a database, a memory module) located on the signaling gateway 102. In some embodiments, the route represents a logical path from the signaling gateway 102 to the signal transfer point 104a and on to the destination node 108a over which messages are directed.

Any number of routes can be configured based on a single linkset (e.g., linkset 140), as long as each route is associated with the point code (e.g., point code 109a) of a single destination node (e.g., destination node 108a). For example, Route A 145 can be configured by associating the linkset 140 with the point code 109a of the destination node 108a. Thereafter, the signaling gateway 102 can receive a data input stream 101a and direct M3UA messages, based on the data input stream 101a and intended for the destination node 108a, to a corresponding signal transfer point (e.g., STP 104a) by using the linkset 140 associated with Route A 145. The signal transfer point 104a then directs SS7 messages, based on the M3UA messages, to the destination node 108a using the SS7 network 106. Concurrently, Route B (not shown) may be configured by associating the linkset 140 with the point code (e.g., point code 109x) of a different destination node (e.g., destination node 108x), and the signaling gateway 102 can direct M3UA messages based on the data input stream 101a to the same signal transfer point 104a by using the linkset 140 which is now associated at the signaling gateway 102 with both Route A 145 and Route B. The signal transfer point 104a then directs SS7 messages, based on the M3UA messages, to the destination node 108x using the SS7 network 106.

A plurality of routes, each route based on a different linkset, can be configured with the point code (e.g., point code 109a) of a single destination node (e.g., destination node 108a). For example, Route A 145 can be configured by associating the linkset 140 with the point code 109a of the destination node 108a. Thereafter, the signaling gateway 102 can receive a data input stream (e.g., data input stream 101a) and direct M3UA messages, based on the data input stream 101a and intended for the destination node 108a, to a corresponding signal transfer point (e.g., STP 104a) by using the linkset 140 associated with Route A 145. The signal transfer point 104a then directs SS7 messages, based on the M3UA messages, to the destination node 108a using the SS7 network 106. Concurrently, Route C (not shown) may be configured by associating a different linkset (e.g., linkset 150) with the point code 109a of the same destination node 108a associated with Route A. The signaling gateway 102 can direct M3UA messages, based on the data input stream 101a and intended for the same destination node 108a now associated at the signaling gateway 102 with both Route A 145 and Route C, to a different signal transfer point 104n by using the linkset 150. The signal transfer point 104a then directs SS7 messages, based on the M3UA messages, to the destination node 108x using the SS7 network 106.

Figure 3:
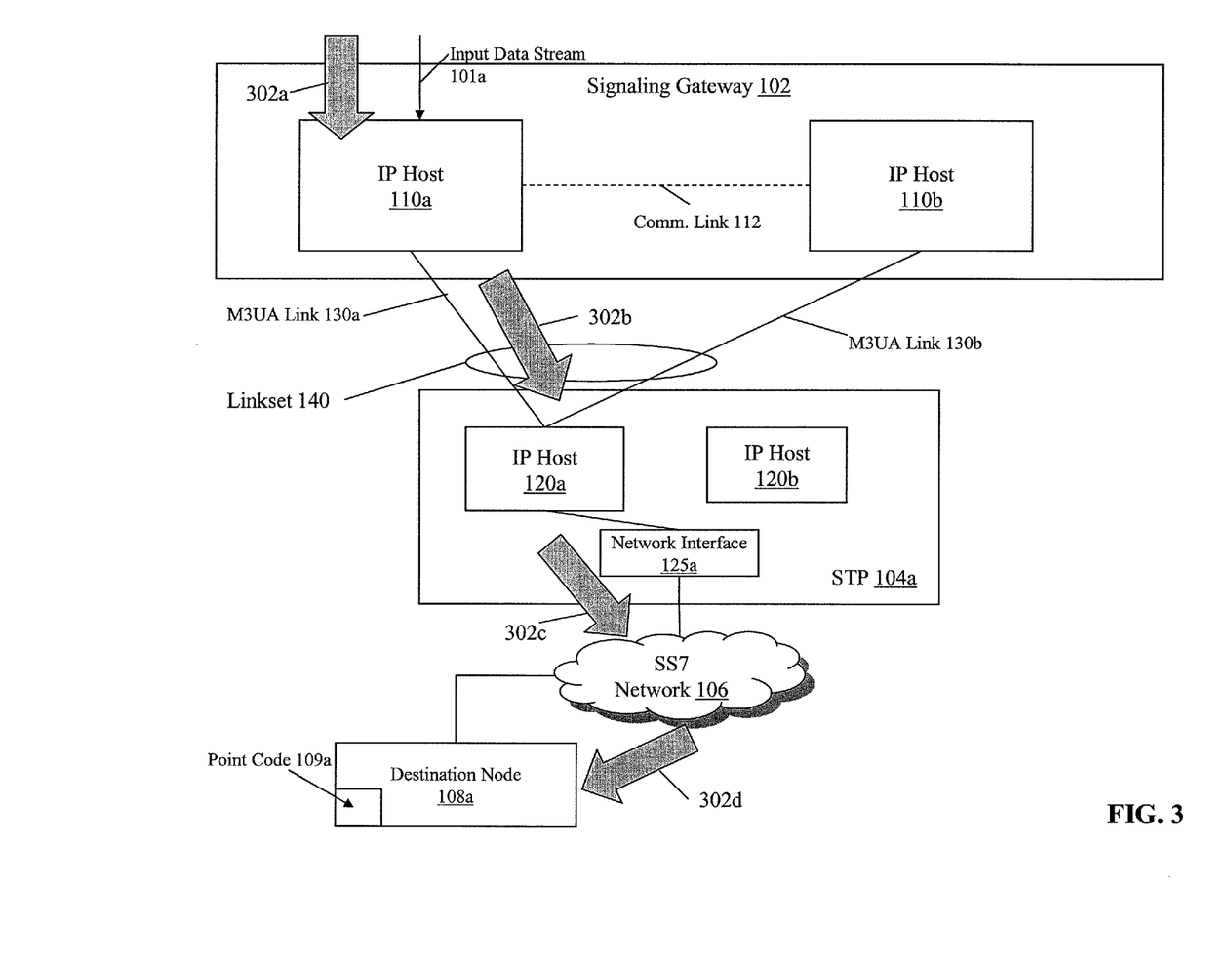
FIG. 3 is a block diagram depicting the flow of traffic along a route as configured according to an illustrative embodiment of the invention.

FIG. 3 is a block diagram depicting the flow of traffic 302a-d along a route based on a linkset (e.g., linkset 140), as configured according an illustrative embodiment of to the invention. An IP host (e.g., IP host 110a) on the signaling gateway 102 receives (302a) an input data stream (e.g., input data stream 101a) which includes messages intended for a destination node (e.g., destination node 108a) in the SS7 network 106. The IP host 110a on the signaling gateway 102 determines a route from a plurality of available routes via which it can direct M3UA messages based on the input data stream 101a to an IP host (e.g., IP host 120a) on a signal transfer point (e.g., signal transfer point 104a) to arrive at the intended destination node 108a. Once the signaling gateway 102 determines a route from the plurality of available routes, the IP host 110a on the signaling gateway 102 selects an M3UA link (e.g., M3UA link 130a) of the linkset (e.g., linkset 140) upon which the route is based. The IP host 110a on the signaling gateway 102 directs (302b) the M3UA messages across the selected M3UA link 130a to the corresponding IP host 120a on the signal transfer point 104a. The IP host 120a at the signaling transfer point 104a directs (302c) SS7 messages, based on the M3UA messages, to its network interface 125a connected to the SS7 network 106. The SS7 messages are subsequently transmitted (302d) over the SS7 network 106 and received at the destination node 108a.

In some embodiments, the IP host 110a on the signaling gateway 102 determines a route by selecting a route associated with the unique point code 109a of the intended destination node 108a according to a predefined algorithm. One possible algorithm is a round-robin selection algorithm where each route associated with the point code 109a of a destination node 108a is selected in a circular fashion without regard to priority. This type of selection process directs the M3UA messaging traffic equally across multiple IP hosts (e.g., IP hosts 120a-n of FIG. 1) and balances the traffic to reduce the risk of network congestion across any one particular IP host (e.g., IP host 120a).

Once the IP host 110a has determined a route, the IP host 110a selects an M3UA link (e.g., M3UA link 130a) of the linkset 140 associated with the determined route. The IP host 110a can select an M3UA link (e.g., M3UA link 130a) of the linkset 140 according to a predetermined priority classification. In one example, the IP host 110a selects the M3UA link 130a which directly connects the IP host 110a with a particular IP host (e.g., IP host 120a) on a signal transfer point (e.g., STP 104a). In another example, the IP host 110a on the signaling gateway 102 selects an M3UA link (e.g., M3UA link 130b) that has been assigned a higher priority than another M3UA link (e.g., M3UA link 130a). The assignment of priority can be based on characteristics associated with the messages (e.g., call type, call destination, call origin). Generally, once the IP host 110a on the signaling gateway 102 selects a route and a corresponding M3UA link 130a of the linkset 140 upon which the route is based for M3UA messages related to a specific telephone call, the IP host 110a continues to use the selected route and M3UA link 130a for the duration of the telephone call.

However, the availability of the IP hosts (e.g., IP hosts 120a-n) on the signal transfer points (e.g., STP 104a-z) and the M3UA links (e.g., the plurality of M3UA links 130a-h) can be disrupted due to unexpected events (e.g., equipment failures, power outages, communications errors, high network congestion levels). For example, the signaling gateway 102 can determine that an M3UA link 130a of the linkset 140 is currently congested (e.g., incurring processing delays due to a backlog of queued traffic) and indicates that it will not accept any additional network traffic. In some embodiments, the signaling gateway 102 determines that the M3UA link 130a is congested by checking a threshold associated with an SCTP transmit buffer. If the signaling gateway 102 determines that the SCTP transmit buffer has reached a predetermined threshold, the M3UA link 130a is congested. As a result, the signaling gateway 102 must be able to redirect M3UA messages via alternate M3UA links in the same linkset 140 and using the same route (e.g., Route A 145) if a particular M3UA link (e.g., M3UA link 130a) of the linkset 140 becomes unavailable. Moreover, load balancing and traffic dispersion concerns emphasize the importance of being able to route M3UA messages to the same IP host (e.g., IP host 120a) on a signal transfer point (e.g., STP 104a) that was previously receiving the M3UA messages before an M3UA link (e.g., M3UA link 130a) was disrupted.

To accomplish this goal, the IP host (e.g., IP host 110a) on the signaling gateway 102 can monitor the availability of M3UA links (e.g., M3UA links 130a-b) of a linkset (e.g., linkset 140) to determine whether the IP host 110*a* can continue to transmit M3UA messages across a particular M3UA link (e.g., M3UA link 130*a*) or whether the IP host 110*a* must select an alternative M3UA link (e.g., M3UA link 130*b*) due to, for example, detection of a failure of the M3UA link 130*a* originally in use.

In one example, the signaling gateway 102 receives an input data stream 101*a* intended for the destination node 108*a*. The signaling gateway 102 selects a route which is associated with the unique point code 109*a* of the destination node 108*a*. The selected route is based on the linkset 140, and the signaling gateway 102 subsequently selects a first M3UA link (e.g., M3UA link 130*a*) of the linkset 140 over which to direct M3UA messages based on the input data stream 101*a* to the IP host 120*a* on the signal transfer point 104*a*. The signaling gateway 102 may select the first M3UA link 130*a* because the first M3UA link 130*a* directly connects the IP host 110*a* on the signaling gateway 102 with the IP host 120*a* on the signal transfer point 104*a*.

The signaling gateway 102 checks the first M3UA link 130*a* and determines, for example, that the first M3UA link 130*a* is unavailable because it does not respond to transmission requests issued by the IP host 110*a*. The signaling gateway 102 then checks a second M3UA link (e.g., M3UA link 130*b*) of the linkset 140 and determines that the second M3UA link 130*b* is available for receipt and transmission of M3UA messages. In this embodiment, the second M3UA link 130*b* indirectly connects the IP host 110*a* on the signaling gateway 102 to the IP host 120*a* on the signal transfer point 104*a* by using the communications link 112 between the IP host 110*a* and the IP host 110*b* on the signaling gateway 102. To maintain the load balancing of the IP hosts (e.g., IP hosts 120*a-n*) on the signal transfer points (e.g., STPs 104*a-z*), the IP host 110*a* directs the M3UA messages to another IP host 110*b* on the signaling gateway 102, and the IP host 110*a* instructs the IP host 110*b* to use the same route that the IP host 110*a* had intended to use (which is based on the same linkset 140 containing an M3UA link 130*b* directly connected to the same IP host 120*a*). The IP host 110*b* on the signaling gateway 102 then directs the M3UA messages to the IP host 120*a* using the M3UA link 130*b*, thereby delivering the M3UA messages to the same IP host 120*a* that had previously been receiving the M3UA messages from the IP host 110*a*.

Similarly, the availability of all M3UA links (e.g., M3UA links 130*a-b*) of a particular linkset (e.g., linkset 140) can be disrupted due to unexpected events. Referring to FIG. 1, for example, the signaling gateway 102 can select a different route if the signaling gateway 102 determines that all of M3UA links (e.g., M3UA links 130*a-b*) of a linkset 140 are unavailable. For example, the signaling gateway 102 receives an input data stream 101*a* intended for the destination node 108*a*. The signaling gateway 102 selects a route which is associated with the unique point code 109*a* of the destination node 108*a*. The selected route is based on the linkset 140, and the signaling gateway 102 subsequently selects a first M3UA link (e.g., M3UA link 130*a*) of the linkset 140 over which to transmit M3UA messages based on the input data stream 101*a* to the IP host 120*a* on the signal transfer point 104*a*. The signaling gateway 102 checks the first M3UA link 130*a* and determines, for example, that the first M3UA link 130*a* is unavailable because it does not respond to transmission requests issued by the IP host 110*a*. The signaling gateway 102 then checks a second M3UA link (e.g., M3UA link 130*b*) of the linkset 140 and determines that the second M3UA link 130*b* is also unavailable. As a result, the signaling gateway 102 determines that there are no available M3UA links of the linkset 140 upon which the selected route is based over which the signaling gateway 102 can direct the M3UA messages.

The signaling gateway 102 then selects a different route that is associated with the unique point code 109*a* of the destination node 108*a* but is based on a different linkset (e.g., linkset 150). The signaling gateway 102 subsequently selects an M3UA link (e.g., M3UA link 130*h*) of the different linkset 150, and directs the M3UA messages to an IP host (e.g., IP host 120*n*) on a signal transfer point (e.g., STP 120*z*). The signal transfer point 120*z* directs SS7 messages based on the M3UA messages to the destination node 108*a* via the SS7 network 106.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), AST (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for establishing M3UA linksets and routes, the method comprising:

generating, at a signaling gateway, a linkset that comprises a plurality of M3UA links between (i) two or more IP hosts on the signaling gateway and (ii) a single IP host on a signal transfer point;

configuring, at the signaling gateway, a route based on the linkset to direct messages from the signaling gateway to a single destination node;

directing messages from the signaling gateway to the single destination node using a directly-connected M3UA link of the linkset, wherein the directly-connected M3UA link connects a first IP host of the two or more IP hosts on the signaling gateway with the single IP host on the signal transfer point; and directing the messages to the single destination node using an indirectly-connected M3UA link of the plurality of M3UA links in response to the directly-connected M3UA link being unavailable, wherein the indirectly-connected M3UA link connects a second IP host of the two or more IP hosts on the signaling gateway with the single IP host on the signal transfer point.

2. The method of claim 1, further comprising configuring, at the signaling gateway, a plurality of routes based on the linkset to direct messages from the signaling gateway to a plurality of destination nodes, wherein each route of the plurality of routes directs messages from the signaling gateway to a different destination node of the plurality of destination nodes.

3. The method of claim 2, further comprising:

selecting one route from the plurality of routes; and directing messages from the signaling gateway to the single destination node using a directly-connected M3UA link of the linkset on which the route is based, wherein the directly-connected M3UA link connects a first IP host of the two or more IP hosts on the signaling gateway with the single IP host on the signal transfer point.

4. The method of claim 1, further comprising:

generating, at the signaling gateway, a plurality of linksets, wherein each linkset of the plurality of linksets comprises a plurality of M3UA links between (i) the two or more IP hosts on the signaling gateway and (ii) a unique IP host on a signal transfer point; and configuring, at the signaling gateway, a plurality of routes to direct messages from the signaling gateway to the single destination node, wherein each route of the plurality of routes is based on a different linkset of the plurality of linksets.

5. The method of claim 1, wherein the route is associated with a point code of the single destination node.

6. The method of claim 1, further comprising determining the directly-connected M3UA link is unavailable based on a network traffic congestion level of the directly-connected M3UA link.

7. The method of claim 6, wherein the network traffic congestion level is determined based on a threshold level of a SCTP transmit buffer.

8. The method of claim 1, further comprising determining the directly-connected M3UA link is unavailable in response to detecting a failure of the directly-connected M3UA link.

9. The method of claim 1, wherein each of the plurality of M3UA links is defined by an IP address and a SCTP port of one of the two or more IP hosts on the signaling gateway, and an IP address and a SCTP port of the single IP host on the signal transfer point.

10. The method of claim 1, wherein the two or more IP hosts on the signaling gateway comprise processors in communication with each other.

11. The method of claim 1, further comprising providing a user interface on the signaling gateway to allow a user to generate the linkset and configure the route.

12. The method of claim 11, wherein generating the linkset further comprises assigning a user-defined name to the linkset.

13. The method of claim 12, further comprising storing the user-defined name in a data storage module on the signaling gateway.

14. The method of claim 1, wherein the signal transfer point and the signaling gateway are different pieces of hardware.

15. The method of claim 1, wherein the single destination node comprises a switch located on a SS7 network.

16. The method of claim 1, further comprising:
selecting a route from a plurality of routes; and
directing messages to the single one of the plurality of destination nodes using a directly-connected M3UA link corresponding to the selected route.

17. The method of claim 1, wherein the messages comprise data packets associated with telephone calls.

18. A method for establishing M3UA linksets and routes, the method comprising:
means for generating, at a signaling gateway, a linkset that comprises a plurality of M3UA links between (i) two or more IP hosts on the signaling gateway and (ii) a single IP host on a signal transfer point;
means for configuring, at the signaling gateway, a route based on the linkset to direct messages from the signaling gateway to a single destination node;
means for directing messages from the signaling gateway to the single destination node using a directly-connected M3UA link of the linkset, wherein the directly-connected M3UA link connects a first IP host of the two or more IP hosts on the signaling gateway with the single IP host on the signal transfer point; and
means for directing the messages to the single destination node using an indirectly-connected M3UA link of the plurality of M3UA links in response to the directly-connected M3UA link being unavailable, wherein the indirectly-connected M3UA link connects a second IP host of the two or more IP hosts on the signaling gateway with the single IP host on the signal transfer point.

19. A system for establishing M3UA linksets and routes, the system comprising:
a linkset generation circuit on a signaling gateway configured to:
generate a linkset that comprises a plurality of M3UA links between (i) two or more IP hosts on the signaling gateway and (ii) a single IP host on a signal transfer point; and
configure a route based on the linkset to direct messages from the signaling gateway to a single destination node; and
the signaling gateway configured to:
direct messages from the signaling gateway to the single destination node using a directly-connected M3UA link of the linkset, wherein the directly-connected M3UA link connects a first IP host of the two or more IP hosts on the signaling gateway with the single IP host on the signal transfer point; and
direct the messages to the single destination node using an indirectly-connected M3UA link of the plurality of M3UA links in response to the directly-connected M3UA link being unavailable, wherein the indirectly-connected M3UA link connects a second IP host of the two or more IP hosts on the signaling gateway with the single IP host on the signal transfer point.

20. A computer program product for establishing M3UA linksets and routes, tangibly embodied in a non-transitory computer-readable storage medium, the computer program product containing instructions being operable to cause a data processing apparatus to:
generate, at a signaling gateway, a linkset that comprises a plurality of M3UA links between (i) two or more IP hosts on the signaling gateway and (ii) a single IP host on a signal transfer point;
configure, at the signaling gateway, a route based on the linkset to direct messages from the signaling gateway to a single destination node;
direct messages from the signaling gateway to the single destination node using a directly-connected M3UA link of the linkset, wherein the directly-connected M3UA link connects a first IP host of the two or more IP hosts on the signaling gateway with the single IP host on the signal transfer point; and
direct the messages to the single destination node using an indirectly-connected M3UA link of the plurality of M3UA links in response to the directly-connected M3UA link being unavailable, wherein the indirectly-connected M3UA link connects a second IP host of the two or more IP hosts on the signaling gateway with the single IP host on the signal transfer point.

21. A method for establishing M3UA linksets and routes, the method comprising:
generating, at the signaling gateway, a plurality of linksets, wherein each linkset of the plurality of linksets comprises a plurality of M3UA links between (i) two or more IP hosts on the signaling gateway and (ii) a unique IP host on a signal transfer point;
configuring, at the signaling gateway, a plurality of routes to direct messages from the signaling gateway to a single destination node, wherein each route of the plurality of routes is based on a different linkset of the plurality of linksets;
directing messages from the signaling gateway to the single destination node using a directly-connected M3UA link of one of the plurality of linksets, wherein the directly-connected M3UA link connects a first IP host of the two or more IP hosts on the signaling gateway with the single IP host on the signal transfer point; and directing the messages to the single destination node using an indirectly-connected M3UA link of the plurality of M3UA links in response to the directly-connected M3UA link being unavailable, wherein the indirectly-connected M3UA link connects a second IP host of the two or more IP hosts on the signaling gateway with the single IP host on the signal transfer point.

* * * * *